US012152757B1

(12) United States Patent
Hanson

(10) Patent No.: US 12,152,757 B1
(45) Date of Patent: Nov. 26, 2024

(54) SOLAR POWERED ILLUMINATION ASSEMBLY

(71) Applicant: Karen Hanson, Norton, MA (US)

(72) Inventor: Karen Hanson, Norton, MA (US)

( * ) Notice: Subject to any disclaimer, the term of this patent is extended or adjusted under 35 U.S.C. 154(b) by 0 days.

(21) Appl. No.: 18/404,004

(22) Filed: Jan. 4, 2024

(51) Int. Cl.
*F21S 9/03* (2006.01)
*F21V 23/06* (2006.01)

(52) U.S. Cl.
CPC .............. *F21S 9/035* (2013.01); *F21V 23/06* (2013.01)

(58) Field of Classification Search
CPC ................................ F21S 9/035; F21V 23/06
See application file for complete search history.

(56) References Cited

U.S. PATENT DOCUMENTS 5,271,594 A 12/1993 Djelouah
7,360,918 B2 4/2008 Trombetta
8,188,671 B2 5/2012 Canter
8,723,434 B2 5/2014 Watson
9,657,909 B2 5/2017 Cohen
2005/0135107 A1* 6/2005 Currie ...................... F21K 9/23 362/382
2005/0253533 A1 11/2005 Lys
2006/0012996 A1 1/2006 Tseng
2006/0238136 A1 10/2006 Johnson, III
2012/0126699 A1* 5/2012 Zittel ...................... F21K 9/232 315/86
2012/0327660 A1* 12/2012 Lin ......................... F21K 9/232 362/253
2013/0223049 A1* 8/2013 Katsaros .................. F21V 3/02 362/183
2016/0252217 A1* 9/2016 Achterhuis ............... F21V 3/00 362/183
2016/0377247 A1* 12/2016 Chang ....................... F21V 3/02 362/158
2017/0363262 A1* 12/2017 Chien ................ F21V 21/0925
2018/0337552 A1 11/2018 Osborne
2020/0018454 A1* 1/2020 Izradel ...................... F21V 3/02
2023/0408052 A1* 12/2023 Lasick ............... F21V 23/0421

FOREIGN PATENT DOCUMENTS

KR 2019097354 8/2019

* cited by examiner

*Primary Examiner* — Evan P Dzierzynski

(57) ABSTRACT

A solar powered illumination assembly for increasing efficiency of ambient lighting includes a housing having an exterior surface to which a set of solar panels is engaged. An integral light emitter and a cap are engaged to and extend from a first face and a second face of the housing, respectively. The cap is threaded and can be threadedly inserted into a socket. A contact, which is operationally engaged to the cap distal from the housing, operationally engages the cap to a source of electrical current. The integral light emitter is operationally engaged to the solar panels and the cap. A power inverter is operationally engaged to the set of solar panels, the cap, and the integral light emitter. The power inverter selectively inverts current from the solar panels or the source of electrical current and selectively supplies inverted current to the integral light emitter.

16 Claims, 8 Drawing Sheets

SOLAR POWERED ILLUMINATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to illumination assemblies and more particularly pertains to a new illumination assembly for increasing efficiency of ambient lighting. The present invention discloses an illumination assembly having a connector or an integral light emitter positioned on the same face of a housing as a set of solar panels. The solar panels are optimally positioned to capture light emitted by the integral light emitter or a nonintegral light emitter engaged to the connector.

(2) Description of Related Art Including Information Disclosed Under 37 CFR 1.97 and 1.98

The prior art relates to illumination assemblies. Prior art may illumination assemblies may comprise light emitting diodes and solar collectors, which are positioned on surfaces that are substantially perpendicular to each other. The solar panels thus are not configured to optimally capture light emitted by the light emitting diodes.

BRIEF SUMMARY OF THE INVENTION

An embodiment of the disclosure meets the needs presented above by generally comprising a housing, which defines an interior space. The housing has an exterior surface comprising a first face, a second face, and a sidewall. The sidewall extends between the first face and the second face. A set of solar panels is engaged to the exterior surface. A cap is engaged to and extends from the second face. The cap is threaded and thus is configured to be threadedly inserted into a socket.

A contact is operationally engaged to the cap distal from the housing. The contact is configured to operationally engage the cap to a source of electrical current. An integral light emitter or a connector is engaged to the first face and is operationally engaged to the solar panels and the cap. The connector is configured to engage a nonintegral light emitter so that the nonintegral light emitter is operationally engaged to the solar panels and the cap.

A power inverter is engaged to the housing, positioned in the interior space, and is operationally engaged to the set of solar panels, the cap, and the integral light emitter or the connector. The power inverter is configured to selectively invert current from the solar panels or the source of electrical current and to selectively supply inverted current to the integral light emitter or the nonintegral light emitter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
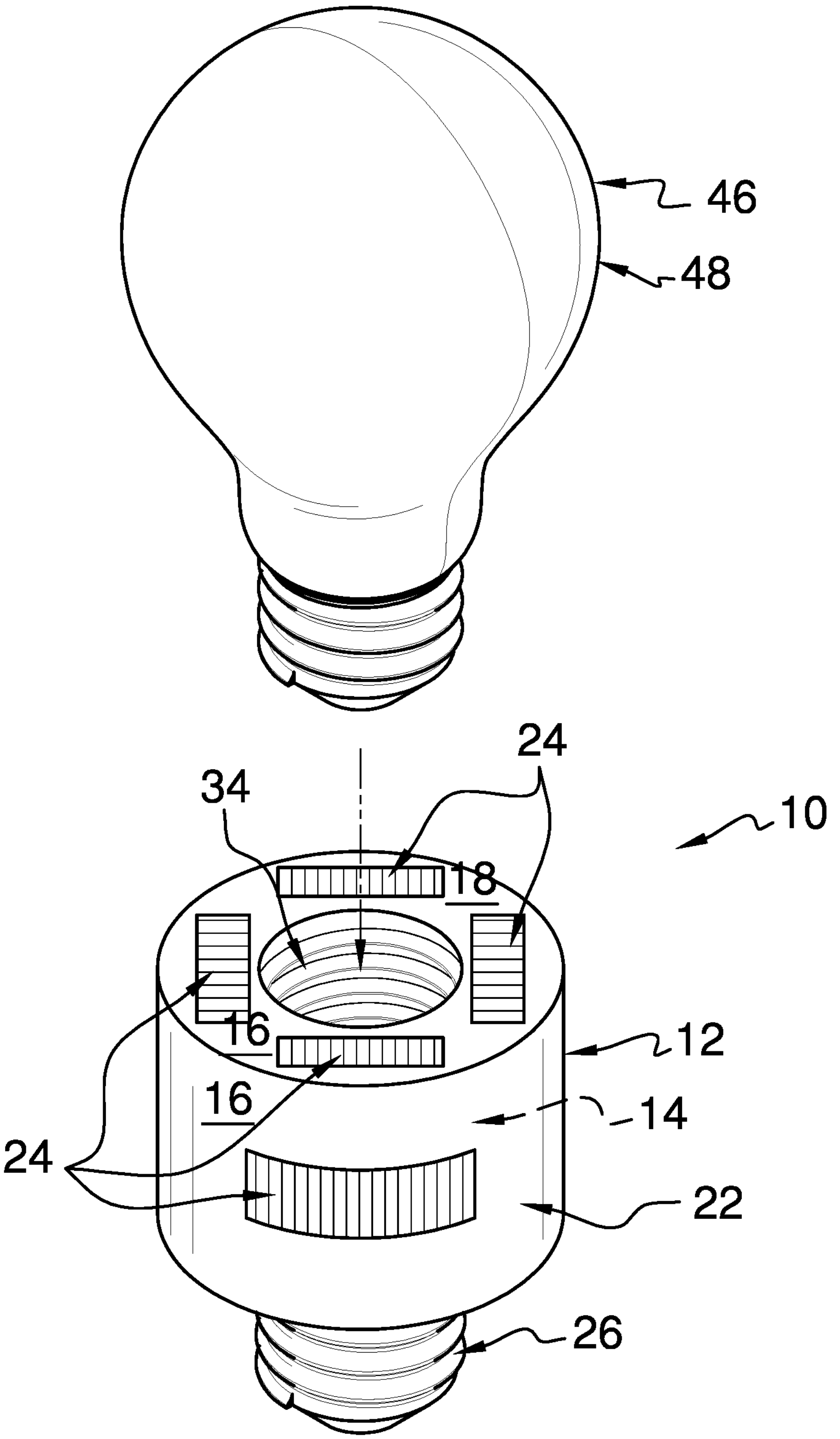
FIG. 1 is an isometric perspective view of a solar powered illumination assembly according to an embodiment of the disclosure.

With reference now to the drawings, and in particular to FIGS. 1 through 9 thereof, a new illumination assembly embodying the principles and concepts of an embodiment of the disclosure and generally designated by the reference numeral 10 will be described.

Figure 4:
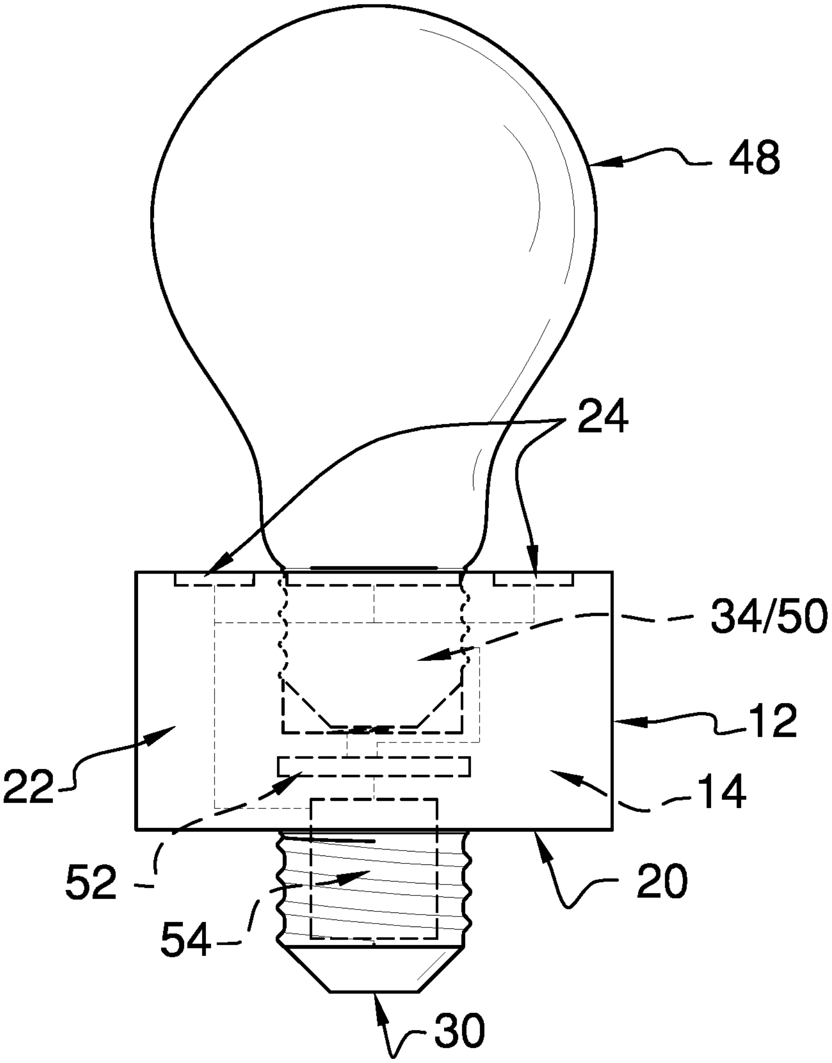
FIG. 4 is an in-use view of an embodiment of the disclosure.
Figure 5:
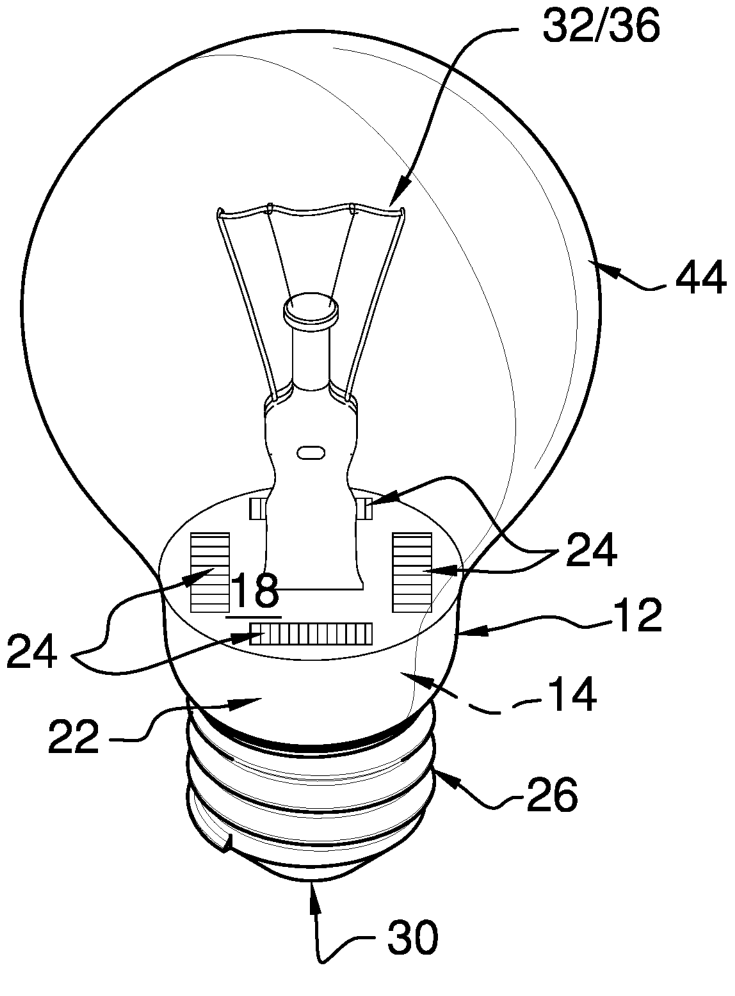
FIG. 5 is an isometric perspective view of an embodiment of the disclosure.

As best illustrated in FIGS. 1 through 9, the solar powered illumination assembly 10 generally comprises a housing 12, which defines an interior space 14. The housing 12 has an exterior surface 16, which comprises a first face 18, a second face 20, and a sidewall 22. The sidewall 22 extends between the first face 18 and the second face 20. The first face 18 and the second face 20 may be substantially parallel and circular, as is shown in FIGS. 1 and 5, so that the housing 12 is formatted complementarily to a light bulb 46.

Figure 2:
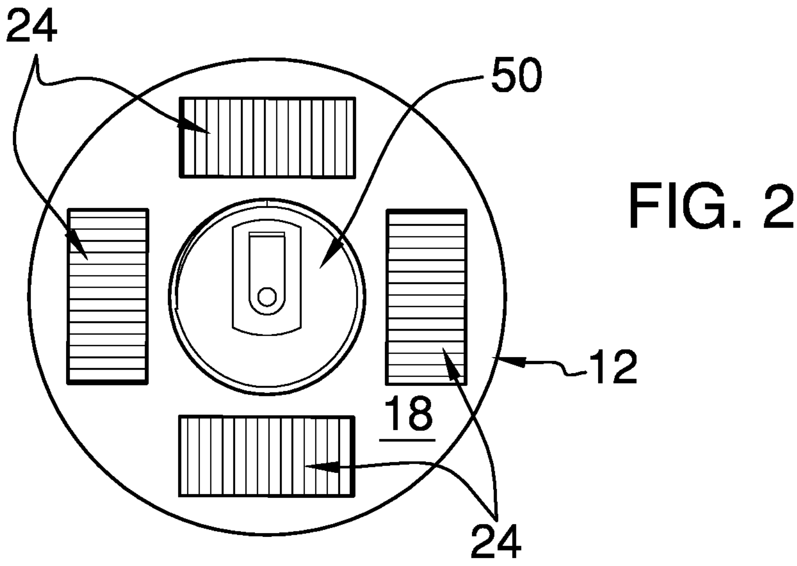
FIG. 2 is a top view of an embodiment of the disclosure.
Figure 3:
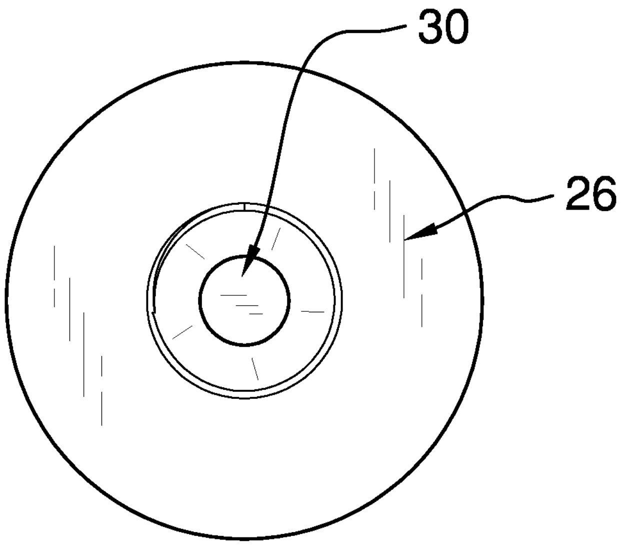
FIG. 3 is a bottom view of an embodiment of the disclosure.

A set of solar panels 24 is engaged to the exterior surface 16. As is shown in FIGS. 2 and 4, the set of solar panels 24 is positioned on the first face 18, although the present invention also anticipates solar panels 24 positioned on the sidewall 22. The set of solar panels 24 may comprise four solar panels 24, or other number of solar panels 24, such as one solar panel 24, two solar panels 24, three solar panels 24, or five or more solar panels 24. The present invention anticipates the set of solar panels 24 substantially covering the first face 18 of the housing 12.

A cap 26 is engaged to and extends from the second face 20. The cap 26 is threaded and thus is configured to be threadedly inserted into a socket 28. The cap 26 is hollow. A contact 30 is operationally engaged to the cap 26 distal from the housing 12. The contact 30 is configured to operationally engage the cap 26 to a source of electrical current.

Figure 6:
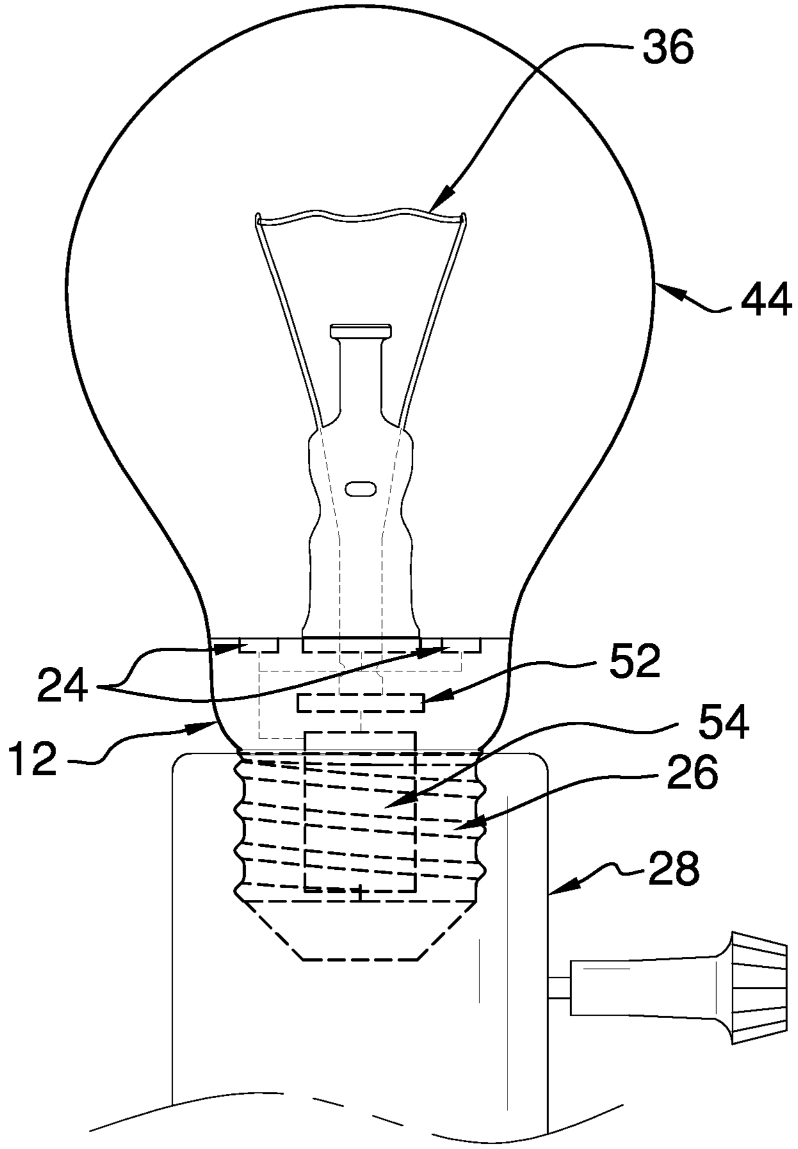
FIG. 6 is an isometric perspective view of an embodiment of the disclosure.
Figure 7:
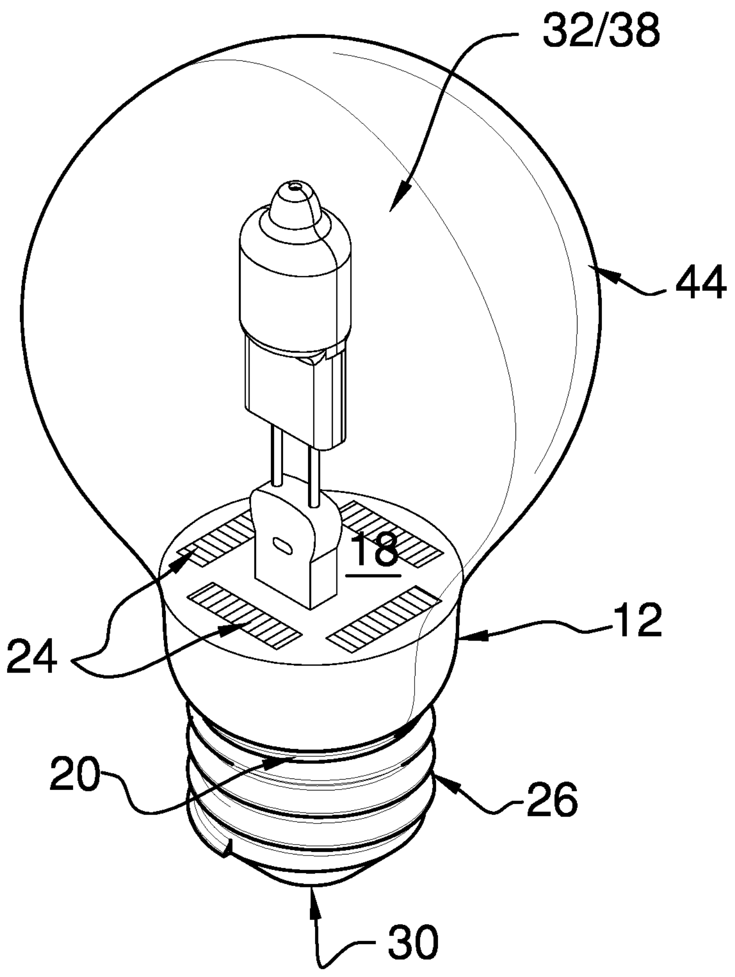
FIG. 7 is an isometric perspective view of an embodiment of the disclosure.

An integral light emitter 32 or a connector 34 is engaged to the first face 18 and is operationally engaged to the solar panels 24 and the cap 26. The integral light emitter 32 may comprise a tungsten filament 36, as is shown in FIGS. 5 and 6, a halogen bulb 38, as is shown in FIG. 7, a fluorescent bulb (not shown), or a set of light emitting diodes 40, as is shown in FIGS. 8 and 9.

Figure 8:
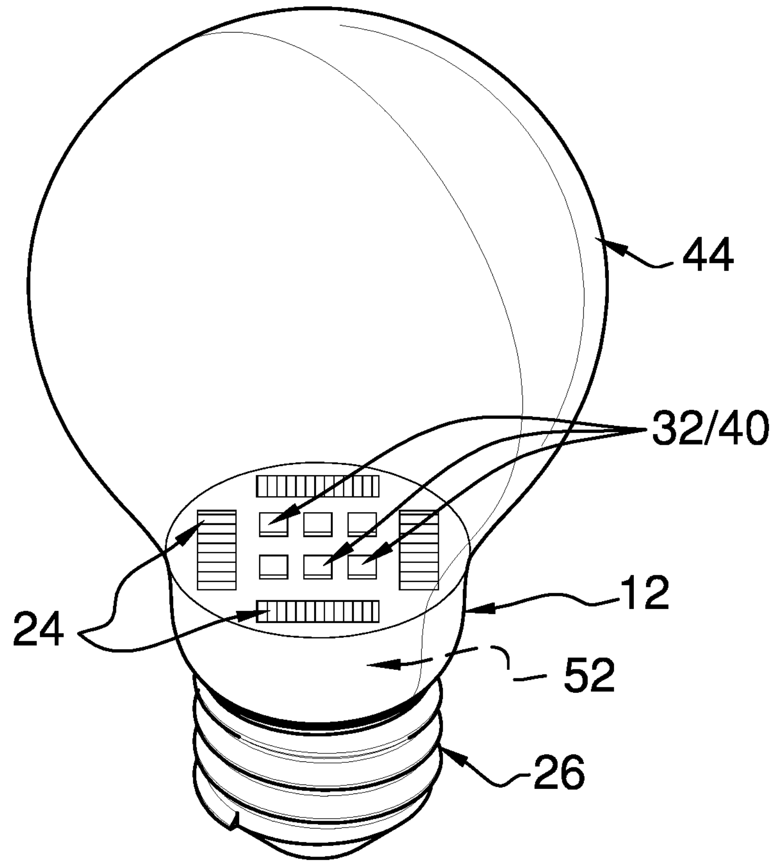
FIG. 8 is an isometric perspective view of an embodiment of the disclosure.
Figure 9:
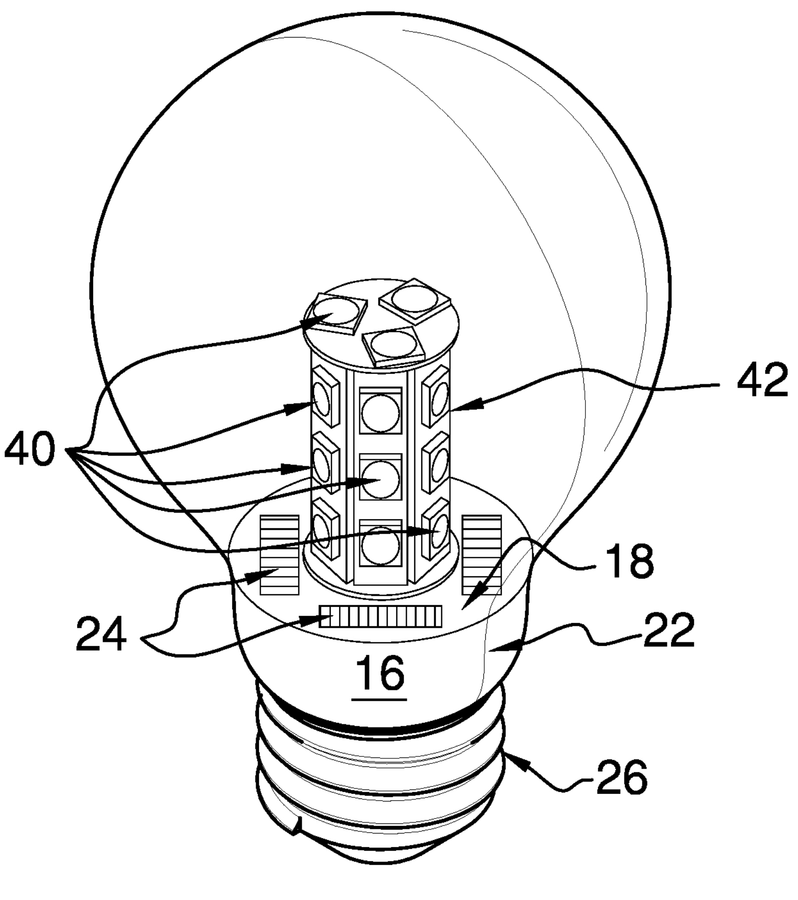
FIG. 9 is an isometric perspective view of an embodiment of the disclosure.

The set of light emitting diodes 40 may be engaged to the first face 18 of the housing 12, as is shown in FIG. 8, or to a tower 42. As is shown in FIG. 9, the tower 42 is engaged to and extends from the first face 18. As is shown in FIGS. 5-9, a shell 44 is engaged to and extends from the first face 18 so that the shell 44 encapsulates the integral light emitter 32. The shell 44, which comprises glass, is substantially transparent and bulb shaped so that an assembly 10 comprising an integral light emitter 32 is formatted similarly to a light bulb 46.

The connector 34 is configured to engage a nonintegral light emitter 48 so that the nonintegral light emitter 48 is operationally engaged to the solar panels 24 and the cap 26. The connector 34 comprises a receptacle 50, which is threaded. The receptacle 50 is configured to threadedly engage a light bulb 46 and thus is configured to operationally engage the light bulb 46.

A power inverter 52 is engaged to the housing 12, positioned in the interior space 14, and is operationally engaged to the set of solar panels 24, the cap 26, and the integral light emitter 32 or the connector 34. The power inverter 52 is configured to selectively invert current from the solar panels 24 or the source of electrical current and to selectively supply inverted current to the integral light emitter 32 or the nonintegral light emitter 48.

The set of solar panels 24 renders the assembly 10 more efficient in illumination of an area proximate to the assembly 10 relative to prior art assemblies lacking solar panels 24 on the first face 18 of the housing 12. The solar panels 24 are positioned to capture light emitted by the integral light emitter 32 or the nonintegral light emitter 48 and are configured to convert the light into a direct current, which is utilized by the integral light emitter 32 or the nonintegral light emitter 48 to produce light. The solar panels 24 also are positioned to capture light from other sources which produce light that impinges upon the solar panels 24.

Operationally, the power inverter 52 would be configured to convert alternating current to direct current when the integral light emitter 32 comprises the set of light emitting diodes 40 and when the light bulb 46 is LED type. Alternatively, the power inverter 52 would be configured to convert direct current to alternating current when the integral light emitter 32 comprises the tungsten filament 36, the halogen bulb 38, or the fluorescent bulb, and when the nonintegral light emitter 48 is of a comparable type requiring alternating current.

A battery 54 is positioned in one or both of the interior space 14 and the cap 26, as is shown in FIGS. 4 and 6. The battery 54 is rechargeable and is operationally engaged to the set of solar panels 24 and the power inverter 52. The battery 54 is positioned to be charged by the set of solar panels 24 and to supply power to the integral light emitter 32 or to the nonintegral light emitter 48.

In use, the cap 26 is threadedly inserted into the socket 28 so that the contact 30 operationally engages the cap 26 to the source of electrical current. The power inverter 52 selectively inverts the current from the solar panels 24 or the source of electrical current and selectively supplies inverted current to the integral light emitter 32, as is shown in FIG. 6, or to the nonintegral light emitter 48, as is shown in FIG. 4.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A solar powered illumination assembly comprising:

a housing defining an interior space, the housing having an exterior surface comprising a first face, a second face, and a sidewall, the sidewall extending between the first face and the second face, said first face being planar;

a set of solar panels engaged to the exterior surface, wherein the set of solar panels is positioned on the first face;

a cap engaged to and extending from the second face, the cap being threaded such that the cap is configured for being threadedly inserted into a socket;

a contact operationally engaged to the cap distal from the housing, such that the contact is configured for operationally engaging the cap to a source of electrical current;

an integral light emitter or a connector engaged to the first face and being operationally engaged to the solar panels and the cap, the connector being configured for engaging a nonintegral light emitter, such that the nonintegral light emitter is operationally engaged to the solar panels and the cap, the integral light emitter and nonintegral light emitter each having a respective maximum peripheral circumference greater than an outer circumference of the housing whereby each of the integral light emitter and nonintegral light emitter overhangs the set of solar panels on the first face; and a power inverter engaged to the housing, positioned in the interior space, and being operationally engaged to the set of solar panels, the cap, and the integral light emitter or the connector, wherein the power inverter is configured for selectively inverting current from the solar panels or the source of electrical current and for selectively supplying inverted current to the integral light emitter or the nonintegral light emitter.

2. The solar powered illumination assembly of claim 1, wherein the first face and the second face are substantially parallel and circular.

3. The solar powered illumination assembly of claim 1, further including:

the cap being hollow; and a battery positioned in one or both of the interior space and the cap, the battery being rechargeable and operationally engaged to the set of solar panels and the power inverter, such that the battery is positioned for being charged by the set of solar panels and for supplying power to the integral light emitter or the nonintegral light emitter.

4. The solar powered illumination assembly of claim 1, wherein the set of solar panels comprises four solar panels.

5. The solar powered illumination assembly of claim 1, wherein the integral light emitter comprises a tungsten filament, a halogen bulb, a fluorescent bulb, or a set of light emitting diodes.

6. The solar powered illumination assembly of claim 5, wherein the set of light emitting diodes is engaged to the first face or to a tower, the tower being engaged to and extending from the first face.

7. The solar powered illumination assembly of claim 1, wherein the connector comprises a receptacle, the receptacle being threaded such that the receptacle is configured for threadedly engaging a light bulb, wherein the receptacle is configured for operationally engaging the light bulb.

8. The solar powered illumination assembly of claim 1, further including a shell engaged to and extending from the first face, such that the shell encapsulates the integral light emitter, the shell being substantially transparent and bulb shaped.

9. The solar powered illumination assembly of claim 8, wherein the shell comprises glass.

10. A solar powered illumination system comprising:

a socket operationally engaged to a source of electrical current;

a housing defining an interior space, the housing having an exterior surface comprising a first face, a second face, and a sidewall, the sidewall extending between the first face and the second face, the first face being planar;

a set of solar panels engaged to the exterior surface, wherein the set of solar panels is positioned on the first face;

a cap engaged to and extending from the second face, the cap being threaded such that the cap is positioned for being threadedly inserted into the socket;

a contact operationally engaged to the cap distal from the housing, such that the contact is positioned for operationally engaging the cap to the source of electrical current;

an integral light emitter engaged to the first face and being operationally engaged to the solar panels and the cap, the integral light emitter having a maximum peripheral circumference greater than an outer circumference of the housing whereby the integral light emitter overhangs the set of solar panels on the first face; and a power inverter engaged to the housing, positioned in the interior space, and being operationally engaged to the set of solar panels, the cap, and the integral light emitter, such that the power inverter is positioned for selectively inverting current from the solar panels or the source of electrical current and for selectively supplying inverted current to the integral light emitter.

11. The solar powered illumination system of claim 10, further including:

the cap being hollow; and a battery positioned in one or both of the interior space and the cap, the battery being rechargeable and operationally engaged to the set of solar panels and the power inverter, such that the battery is positioned for being charged by the set of solar panels and for supplying power to the integral light emitter.

12. The solar powered illumination system of claim 10, wherein the set of solar panels comprises four solar panels.

13. The solar powered illumination system of claim 10, wherein the integral light emitter comprises a tungsten filament, a halogen bulb, a fluorescent bulb, or a set of light emitting diodes.

14. The solar powered illumination system of claim 13, wherein the set of light emitting diodes is engaged to the first face or to a tower, the tower being engaged to and extending from the first face.

15. The solar powered illumination system of claim 10, further including:

a nonintegral light emitter;

a connector engaged to the first face in place of the integral light emitter, the connector being operationally engaged to the solar panels and the cap, the connector being selectively engageable to the nonintegral light emitter, such that the nonintegral light emitter is operationally engaged to the solar panels and the cap; and the power inverter being operationally engaged to the connector, such that the power inverter is positioned for selectively supplying inverted current to the nonintegral light emitter.

16. A solar powered illumination assembly comprising:

a housing defining an interior space, the housing having an exterior surface comprising a first face, a second face, and a sidewall, the sidewall extending between the first face and the second face, the first face being planar, the first face and the second face being substantially parallel and circular;

a set of solar panels engaged to the exterior surface, the set of solar panels being positioned on the first face, the set of solar panels comprising four solar panels;

a cap engaged to and extending from the second face, the cap being threaded such that the cap is configured for being threadedly inserted into a socket, the cap being hollow;

a contact operationally engaged to the cap distal from the housing, such that the contact is configured for operationally engaging the cap to a source of electrical current;

an integral light emitter or a connector engaged to the first face and being operationally engaged to the solar panels and the cap, the connector being configured for engaging a nonintegral light emitter, such that the nonintegral light emitter is operationally engaged to the solar panels and the cap, the integral light emitter and nonintegral light emitter each having a respective maximum peripheral circumference greater than an outer circumference of the housing whereby each of the integral light emitter and nonintegral light emitter overhangs the set of solar panels on the first face, the integral light emitter comprising a tungsten filament, a halogen bulb, a fluorescent bulb, or a set of light emitting diodes, the set of light emitting diodes being engaged to the first face or to a tower, the tower being engaged to and extending from the first face, the connector comprising a receptacle, the receptacle being threaded such that the receptacle is configured for threadedly engaging a light bulb, wherein the receptacle is configured for operationally engaging the light bulb;

a shell engaged to and extending from the first face, such that the shell encapsulates the integral light emitter, the shell being substantially transparent and bulb shaped, the shell comprising glass;

a power inverter engaged to the housing, positioned in the interior space, and being operationally engaged to the set of solar panels, the cap, and the integral light emitter or the connector, wherein the power inverter is configured for selectively inverting current from the solar panels or the source of electrical current and for selectively supplying inverted current to the integral light emitter or the nonintegral light emitter; and a battery positioned in one or both of the interior space and the cap, the battery being rechargeable and operationally engaged to the set of solar panels and the power inverter, such that the battery is positioned for being charged by the set of solar panels and for supplying power to the integral light emitter or the nonintegral light emitter.

* * * * *